(12) United States Patent
Chang et al.

(10) Patent No.: US 8,030,876 B2
(45) Date of Patent: Oct. 4, 2011

(54) STEPPER MOTOR DEVICE WITH COMPENSATING NON-SINUSOIDAL DRIVING VALUES AND METHOD OF PRODUCING THE DRIVING VALUES

(75) Inventors: Christopher C. Chang, Brentwood, CA (US); Edward Li, Culver City, CA (US); Thomas Judge, San Leandro, CA (US)

(73) Assignee: Arcus Technology, Inc., Livermore, CA (US)

( * ) Notice: Subject to any disclaimer, the term of this patent is extended or adjusted under 35 U.S.C. 154(b) by 328 days.

(21) Appl. No.: 12/240,777

(22) Filed: Sep. 29, 2008

(65) Prior Publication Data

US 2009/0085509 A1 Apr. 2, 2009

Related U.S. Application Data

(60) Provisional application No. 60/975,795, filed on Sep. 27, 2007.

(51) Int. Cl.
*H02P 8/00* (2006.01)

(52) U.S. Cl. ............... 318/685; 318/696; 702/105

(58) Field of Classification Search ............ 318/685, 318/696, 700, 400.01, 400.34; 702/105; 324/772

See application file for complete search history.

(56) References Cited

U.S. PATENT DOCUMENTS

| 4,618,808 | A | * | 10/1986 | Ish-Shalom et al. | 318/696 |
|---|---|---|---|---|---|
| 5,134,349 | A | * | 7/1992 | Kruse | 318/400.34 |
| 5,321,342 | A | * | 6/1994 | Kruse | 318/400.04 |
| 6,747,431 | B1 | * | 6/2004 | Marra et al. | 318/599 |
| 7,405,532 | B2 | * | 7/2008 | Chang | 318/696 |
| 7,560,893 | B2 | * | 7/2009 | Thomson | 318/685 |
| 2002/0185926 | A1 | * | 12/2002 | King et al. | 310/68 B |
| 2010/0135709 | A1 | * | 6/2010 | McNestry et al. | 400/236 |
| 2010/0244887 | A1 | * | 9/2010 | De Cock | 324/772 |

* cited by examiner

*Primary Examiner* — Eduardo Colon-Santana
(74) *Attorney, Agent, or Firm* — Thomas H. Ham; Wilson Ham & Holman

(57) ABSTRACT

A stepper motor device uses compensating non-sinusoidal driving values to compensate for operational non-sinusoidal drive characteristics of a motor of the device due to at least design and manufacturing imperfections in the motor. The compensating non-sinusoidal driving values may be derived using back electromagnetic force produced from the motor or using measured rotational positions of the motor when the motor is driven using known driving values.

15 Claims, 8 Drawing Sheets

STEPPER MOTOR DEVICE WITH COMPENSATING NON-SINUSOIDAL DRIVING VALUES AND METHOD OF PRODUCING THE DRIVING VALUES

CROSS REFERENCE TO RELATED APPLICATION

This application is entitled to the benefit of U.S. Provisional Patent Application Ser. Nos. 60/975,795, filed on Sep. 27, 2007, which is incorporated herein by reference.

BACKGROUND OF THE INVENTION

Stepper motor devices are widely used in various applications, such as printers, disk drives, toys, windshield wipers, fans, vibrating cell phones, robotic arms and video cameras. A stepper motor device includes a stepper motor and a stepper driver to provide driving signals to stator coils of the stepper motor to drive the stepper motor. In a typical bi-polar two phase stepper motor device, two 90-degree offset sinusoidal values are used to produce two driving signals, which are applied to the two stator coils of the motor. The first sinusoidal signal values are values derived from a perfect sine wave, while the second sinusoidal signal values are values derived from a perfect cosine wave. Using these sinusoidal values, the stepper motor can theoretically be driven precisely with respect to position and speed. However, due to imperfect step motor design and manufacturing, the use of these sinusoidal drive values may not produce the desired positional and speed performance of the stepper motor.

Therefore, there is a need for a stepper motor device that can be controlled with more precision.

SUMMARY OF THE INVENTION

A stepper motor device uses compensating non-sinusoidal driving values to compensate for operational non-sinusoidal drive characteristics of a motor of the device. The compensating non-sinusoidal driving values may be derived using back electromagnetic force produced from the motor or using measured rotational positions of the motor when the motor is driven using known driving values. The compensating non-sinusoidal driving values allow the stepper motor device to be controlled with more precision with respect to position and speed since the operational non-sinusoidal drive characteristics of the motor is taken into consideration.

A stepper motor device in accordance with an embodiment of the invention comprises a motor and a motor driver. The motor driver is connected to the motor to provide first and second driving signals to drive the motor. The driver motor comprises memory, a drive power circuitry and a logic controller. The memory includes a first array of compensating non-sinusoidal driving values and a second array of compensating non-sinusoidal driving values. The compensating non-sinusoidal driving values of the first and second arrays are configured to compensate for operational non-sinusoidal drive characteristics of the motor. The power circuitry is connected to the motor to supply the first and second driving signals to the motor using the compensating non-sinusoidal driving values of the first and second arrays. The logic controller is connected to the power circuitry to provide the compensating non-sinusoidal driving values of the first and second arrays to the power circuitry to drive the motor.

A method of producing compensating non-sinusoidal driving values for a stepper motor device in accordance with an embodiment of the invention comprises providing a motor of the stepper motor device, driving the motor to determine operational non-sinusoidal drive characteristics of the motor, and generating the compensating non-sinusoidal driving values for the motor of the stepper motor device using the operational non-sinusoidal drive characteristics of the motor so that the operational non-sinusoidal drive characteristics of the motor are compensated when the compensating non-sinusoidal driving values are used to drive the motor.

A method of producing compensating non-sinusoidal driving values for a stepper motor device in accordance with another embodiment of the invention comprises providing a motor of the stepper motor device, driving the motor at a constant rotational speed, measuring back electromagnetic force on stator coils of the motor to determine operational non-sinusoidal drive characteristics of the motor, and selecting the compensating non-sinusoidal driving values that correspond to the measured back electromagnetic force so that the operational non-sinusoidal drive characteristics of the motor are compensated when the compensating non-sinusoidal driving values are used to drive the motor.

A method of producing compensating non-sinusoidal driving values for a stepper motor device in accordance with another embodiment of the invention comprises providing a motor of the stepper motor device, driving the motor using known sinusoidal drive signals, measuring the positions of the rotor to determine operational non-sinusoidal drive characteristics of the motor, and selecting the compensating non-sinusoidal driving values using the measured positions so that the operational non-sinusoidal drive characteristics of the motor are compensated when the compensating non-sinusoidal driving values are used to drive the motor.

Other aspects and advantages of the present invention will become apparent from the following detailed description, taken in conjunction with the accompanying drawings, illustrated by way of example of the principles of the invention.

DETAILED DESCRIPTION

Figure 1:
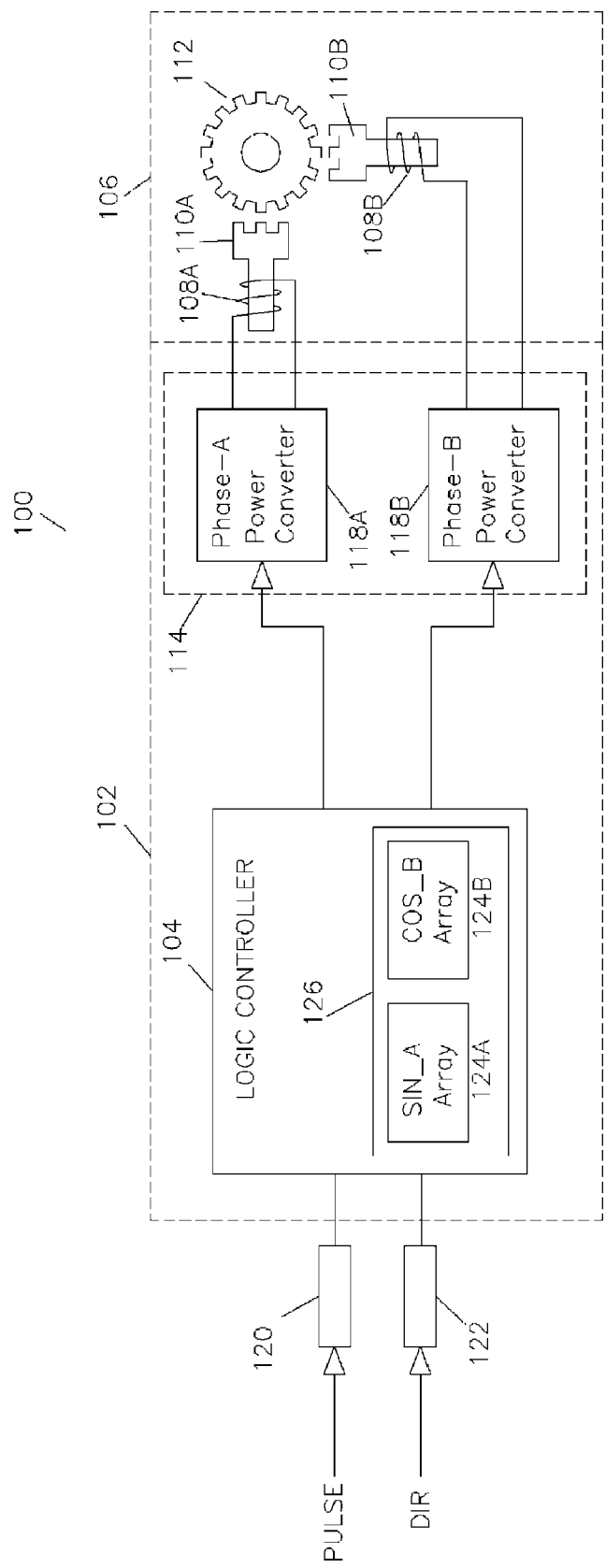
FIG. 1 is a block diagram of a stepper motor device that uses compensating non-sinusoidal driving values in accordance with an embodiment of the invention.

With reference to FIG. 1, a microstepper motor device 100 in accordance with an embodiment of the invention is described. The microstepper motor device 100 includes a motor driver 102 with microstepping control capability, which is facilitated by a logic controller 104, which can be a microcontroller, complex programmable logic device (CPLD), field-programmable gate array (FPGA), or application specific integrated circuit (ASIC) that is configured to function as the translator of the driver. As described in more detail below, the logic controller 104 is configured to use compensating non-sinusoidal driving values to drive a stepper motor 106 with greater precision because the compensating non-sinusoidal driving values are derived to compensate for what are herein referred to as "imperfections" of a stepper motor, which may include non-optimized gap distance between the rotor and the stator teeth, asymmetric mechanical friction, non-uniform motor teeth and motor winding irregularities. The imperfections of the motor affect the rotational position and speed accuracy and performance ("operational non-sinusoidal drive characteristics") of the motor as the motor is driven, which can be compensated by using the compensating non-sinusoidal driving values, rather than using conventional sinusoidal values derived from perfect sine and cosine waves. Thus, the stepper motor 106 can be driven with greater precision with the compensating non-sinusoidal driving values than with the conventional sinusoidal values.

As shown in FIG. 1, the microstepper motor device 100 includes the stepper motor 106 and the microstepper motor driver 102, which provides driving signals to two stator coils or windings 108A and 108B of the stepper motor 106. The stator coils 108A and 108B are positioned to engage stators 110A and 110B, respectively. The stators 110A and 110B are positioned in close proximity to a rotor 112 such that the teeth of the stators are facing the magnetic teeth of the rotor. Thus, in this embodiment, the microstepper motor device 100 is a two-phase stepper motor. However, in other embodiments, the microstepper motor device 100 may be a different multi-phase stepper motor, such as a three-phase or five-phase stepper motor. The motor driver 102 comprises the logic controller 104 and power circuitry 114, which includes a phase-A power converter 118A and a phase-B power converter 118B. The power circuitry 114 may additionally include damping and decay control components, as well as other components. However, these components are not described herein so as to not obscure the inventive features of the stepper motor device 100.

The logic controller 104 of the motor driver 102 is connected to pins or terminals 120 and 122 that receive pulse and direction signals, respectively, from an external controller (not shown). The logic controller 104 is configured to output two digital values, SIN_A and COS_B, which are the compensating non-sinusoidal driving values, in response to the pulse and direction signals from the external controller. In this embodiment, the compensating non-sinusoidal driving values SIN_A and COS_B are stored as two arrays 124A and 124B in memory 126, which may be non-volatile memory. In the illustrated embodiment, the memory 126 is integrated with the logic controller 104. In other embodiments, the memory 126 may be external to the logic controller 104. The array 124A contains the compensating non-sinusoidal driving values SIN_A, while the array 124B contains the compensating non-sinusoidal driving values COS_B. As described below, the compensating non-sinusoidal driving values SIN_A and COS_B differ from values of perfect sine and cosine waves in order to compensate for the imperfections of the stepper motor 106. The resolution of these compensating non-sinusoidal driving values SIN_A and COS_B in the arrays 124A and 124B determines the step size of the microstepping control. Thus, finer microstepping control is possible with finer resolution of the compensating non-sinusoidal driving values SIN_A and COS_B in the arrays 124A and 124B.

The phase-A power converter 118A and phase-B power converter 118B of the power circuitry 114 are connected to the logic controller 104 to receive the digital SIN_A and COS_B values. Specifically, the phase-A power converter 118A receives the digital SIN_A value, while the phase-B power converter 118B receives the digital COS_B value. The phase-A power converter 118A is configured to convert the received digital SIN_A value to corresponding power signal, which is an analog representation of the received SIN_A value. Similarly, the phase-B power converter 118B is configured to convert the received digital COS_B value to a corresponding power signal, which is an analog representation of the received COS_B value. The phase-A power converter 118A is configured to supply a current-controlled driving signal to the stator coil 108A using the signal from the logic controller 104 to generate electromagnetic force (EMF) from the stator 110A. Similarly, the phase-B power converter 118B is configured to supply a current-controlled driving signal to the other coil 108B of the stepper motor 106 using the signal from the logic controller 104 to generate EMF from the stator 110B. In an embodiment, the phase-A and phase-B power converters 118A and 118B are implemented as H-bridges.

Figure 2A:
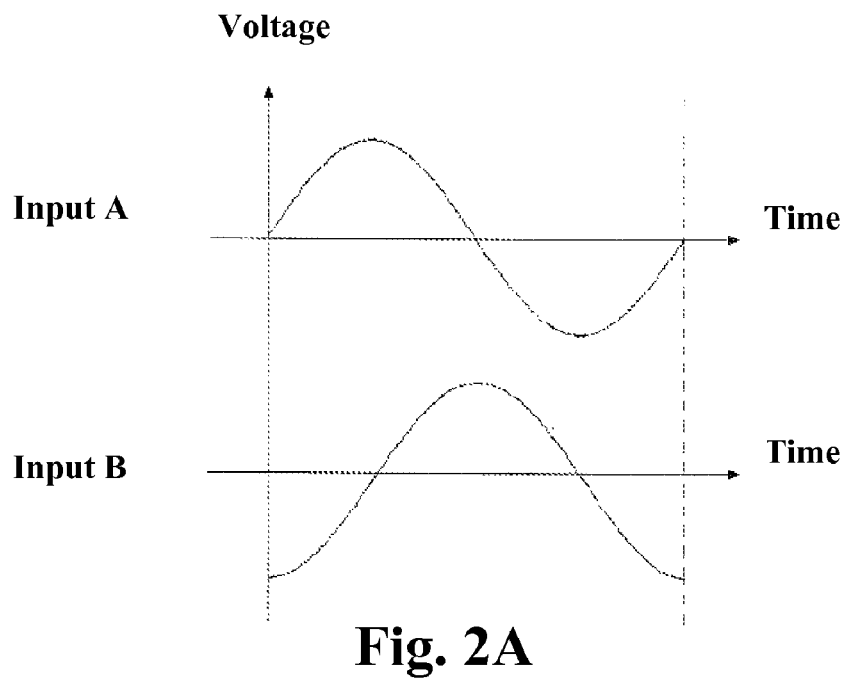
FIG. 2A illustrates two inputs that are derived from perfect sine and cosine waves that are commonly used to drive a stepper motor device.
Figure 2B:
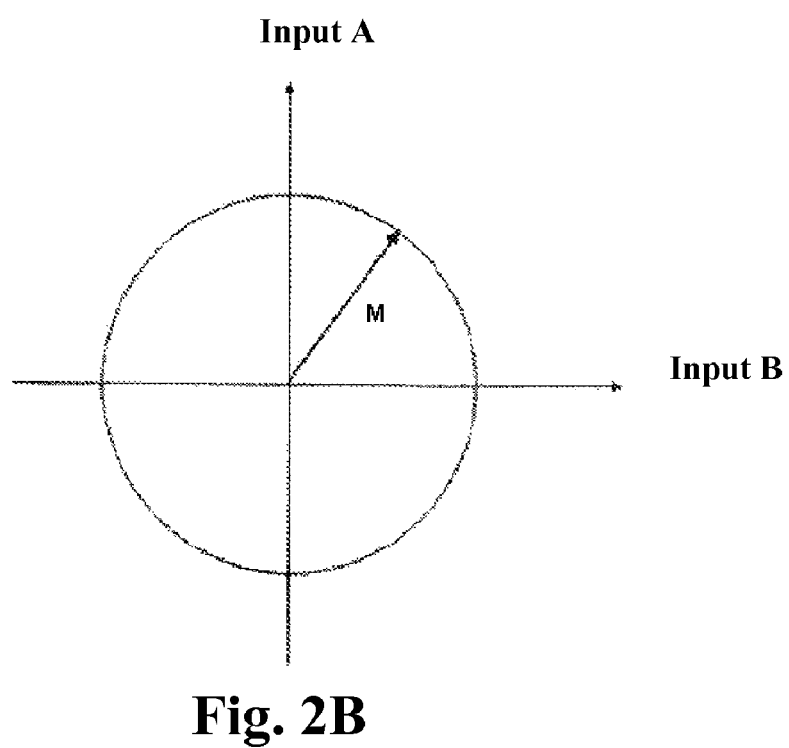
FIG. 2B is a vector graph of motor torque in microstepping mode for an ideal stepper motor.

In theory, two-phase stepper motor should be driven using two input values, Input A and Input B, which are values derived from sinusoidal waves. Input A is a value from a perfect sine wave, while Input B is a value from a perfect cosine wave, as illustrated in FIG. 2A. The resulting magnetic force M due to Input A and Input B can be mathematically expressed as $M^2=A^2+B^2$, where A is Input A, B is Input B and M is the resulting magnetic force. This relationship is illustrated in FIG. 2B, which is a vector graph of motor torque in microstepping mode for an ideal stepper motor. Using the corresponding pairs of Input A and Input B, the magnetic force vector M can be represented by a circle, providing infinite resolution and constant torque.

Figure 3:
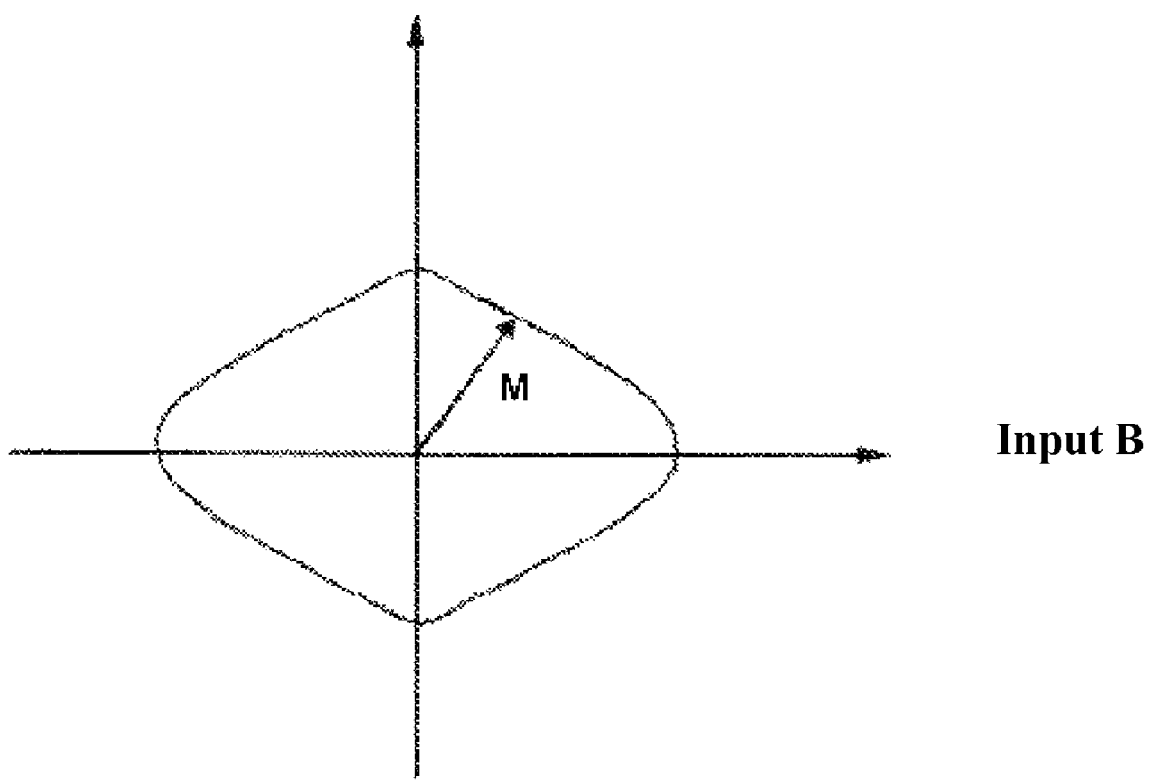
FIG. 3 shows an example of a vector graph of motor torque in microstepping mode for an actual imperfect stepper motor.

However, in the real world, the resulting magnetic force will vary from the ideal magnetic force due to imperfections of a stepper motor. Thus, the actual resulting magnetic force may not be uniform, which may result in a variable motor torque, as illustrated in FIG. 3, which shows an example of a vector graph of motor torque in microstepping mode for an actual imperfect stepper motor. This variable motor torque results in a non-uniform speed as the motor is microstepped. Furthermore, the rotational motor position will not increment in a uniform manner with each microstep. Thus, in order to compensate for these variations of the actual stepper motor, Input A and the Input B can be modified to different values so that a more constant motor torque, similar to the constant motor torque shown in FIG. 2B, is produced so that more accurate positional stepping and smoother velocity for the motor can be achieved. This is the underlying basis for the compensating non-sinusoidal driving values SIN_A and COS_B of the arrays 124A and 124B used in the stepper motor device 100 of FIG. 1. Depending on the imperfections of the stepper motor 106, the compensating non-sinusoidal driving values SIN_A and COS_B are set to compensate for these imperfections to produce a more constant torque. The compensating non-sinusoidal driving values SIN_A will resemble values of a perfect sine wave, as illustrated in FIG. 2A. However, some of these compensating non-sinusoidal driving values SIN_A will stray from the perfect sine wave to compensate for the imperfections of the stepper motor 106.

The amount of stray of the compensating non-sinusoidal driving values SIN_A from the perfect sine wave, i.e., the difference between one of the compensating non-sinusoidal driving values SIN_A and a corresponding value of the perfect sine wave, will depend on the degree of imperfections of the stepper motor 106. Similarly, the compensating non-sinusoidal driving values COS_B will resemble values of a perfect cosine wave, as illustrated in FIG. 2A. However, some of these compensating non-sinusoidal driving values COS_B will stray from the perfect cosine wave to compensate for the imperfections of the stepper motor 106. The amount of stray of the compensating non-sinusoidal driving values COS_B from the perfect cosine wave, i.e., the difference between one of the compensating non-sinusoidal driving values COS_B and a corresponding value of the perfect cosine wave, will depend on the degree of imperfections of the stepper motor 106.

In an embodiment, the compensating non-sinusoidal driving values SIN_A and COS_B used in the stepper motor device 100 are derived using the back EMF of the stepper motor 106 to determine the operational non-sinusoidal drive characteristics of the stepper motor, which will be dependent on the imperfections of the stepper motor. This process for generating the compensating non-sinusoidal driving values SIN_A and COS_B will be described with reference to FIG. 4.

Figure 4:
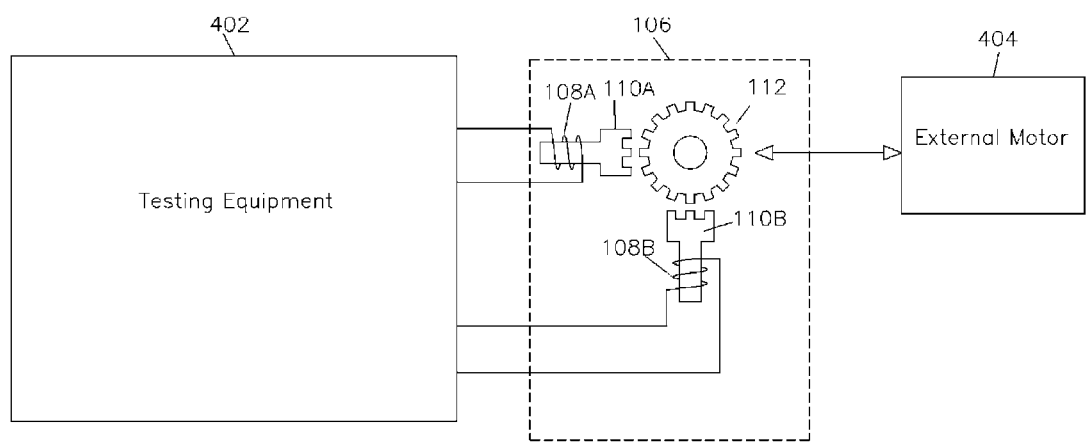
FIG. 4 illustrates a setup to derive the compensating non-sinusoidal driving values used in the device of FIG. 1.

As shown in FIG. 4, the stepper motor 106 is provided without the motor driver 102. The stator coils 108A and 108B of the stepper motor 106 are electrically connected to a testing equipment 402, which is configured to measure the back EMF produced in the coils. The rotor 112 of the stepper motor 106 is physically attached to an external motor 404, which can drive the stepper motor 106, i.e., rotate the rotor 112 of the stepper motor. The external motor 404 is used to drive the stepper motor 106 at a constant rotational speed, which produces back EMF in the stator coils 108A and 108B. The back EMF in the stator coils 108A and 108B is measured as voltages on the coils by the testing equipment 402 at various times to collect back EMF values. If the stepper motor 106 is an ideal stepper motor, the collected back EMF values of the two coils should resemble a circle, such as the circle shown in FIG. 2B. However, if the stepper motor 106 has imperfections, the collected back EMF values would resemble an imperfect circle, such as the imperfect circle shown in FIG. 3. The collected back EMF values are then used to select the compensating non-sinusoidal driving values SIN_A and COS_B so that the magnetic force produced by the selected values will resemble the collected back EMF values. That is, the waveform defined by the back EMF values should be the waveform defined by the selected values SIN_A and COS_B to drive the stepper motor 106 for minimum torque ripple since as the drive voltage follows the induced back EMF by a scaling factor, the voltage across the stator coils 108A and 108B and the drive current through the coils remain constant, resulting in reduced current ripple. Thus, the selected values SIN_A and COS_B may correspond to the back EMF values that are adjusted by a scaling factor. The selected values SIN_A and COS_B are then stored in the memory 126 of the motor driver 102, which is then attached to the stepper motor 106 to produce the stepper motor device 100.

In another embodiment, the compensating non-sinusoidal driving values are derived using conventional sinusoidal values to drive the stepper motor to determine the operational non-sinusoidal drive characteristics of the stepper motor 106. This process for generating the compensating non-sinusoidal driving values will be described with reference to FIG. 5.

Figure 5:
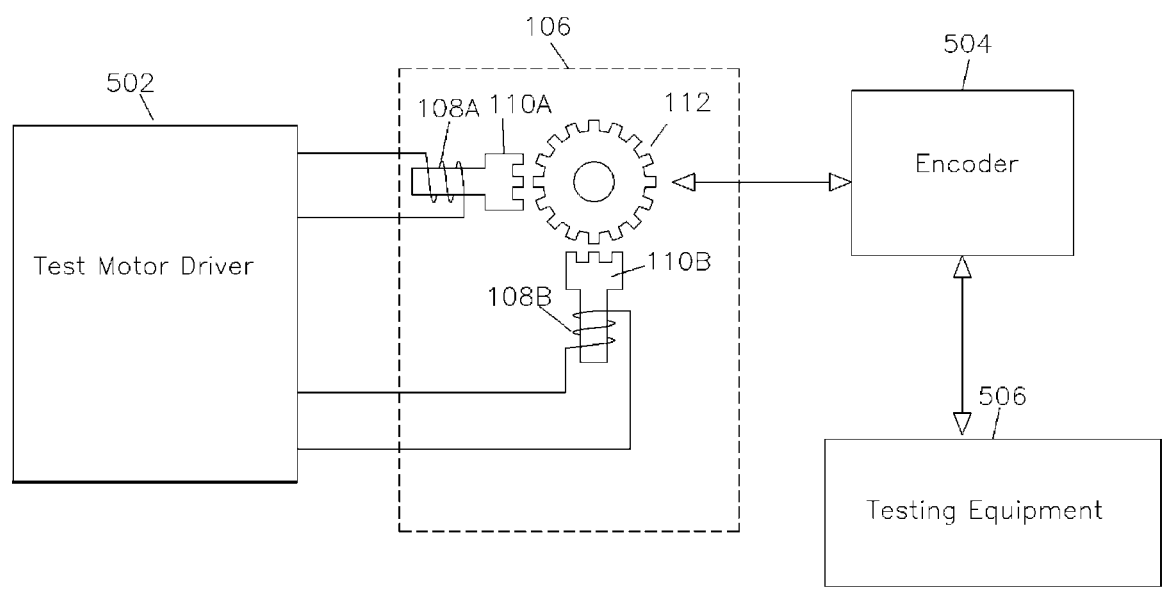
FIG. 5 illustrates another setup to derive the compensating non-sinusoidal driving values used in the device of FIG. 1.

As shown in FIG. 5, the stepper motor 106 is provided with a test motor driver 502. The stator coils 108A and 108B of the stepper motor 106 are electrically connected to the test motor driver 502, which is configured to provide driving signals using known conventional sinusoidal values. The rotor 112 of the stepper motor 106 is coupled to an encoder 504, which is configured to measure the rotational positions of the rotor as the rotor is driven by the test motor driver 502. The encoder 504 is connected to a testing equipment 506, which is configured to collect position values of the rotor 112 generated by the encoder. If the stepper motor 106 is an ideal stepper motor, the collected position values will perfectly match the expected positions of a uniform motor rotation. However, if the stepper motor 106 has imperfections, the collected position values will deviate from the expected positions. The collected position values are then analyzed to derive the compensating non-sinusoidal driving values SIN_A and COS_B so that the stepper motor 106 driven with these modified values will improve the uniformity of the motor rotation. As an example, the compensating non-sinusoidal driving values SIN_A and COS_B can be derived using a curving fitting technique for the ideal curve defined by the expected rotor positions using the conventional sinusoidal values. As another example, the compensating non-sinusoidal driving values SIN_A and COS_B can be derived empirically using trial and error to produce the desired rotor positions. The selected values SIN_A and COS_B are then stored in the memory 126 of the motor driver 102, which is then attached to the stepper motor 106 to produce the stepper motor device 100.

In still another embodiment, the compensating non-sinusoidal driving values are derived using varying driving values on the stepper motor 106 to determine the operational non-sinusoidal drive characteristics of the stepper motor. This process for generating the compensating non-sinusoidal driving values will also be described with reference to FIG. 5.

In this embodiment, the test motor driver 502 provides driving signals using varying test driving values to the stator coils 108A and 108B of the stepper motor 106 so that the rotor 112 is driven to target rotational positions, which may correspond to the expected positions of an ideal stepper driven using the conventional sinusoidal values. For each incremental target position, the test driving values used to achieve the target position are recorded. The test driving value used on the stator coil 108A will be the compensating non-sinusoidal driving value SIN_A for the current target position. Similarly, the test driving value used on the stator coil 108B will be the compensating non-sinusoidal driving value COS_B for the current target position. Thus, these recorded driving values for the different target positions are the compensating non-sinusoidal driving values SIN_A and COS_B. The selected values SIN_A and COS_B are then stored in the memory 126 of the motor driver 102, which is then attached to the stepper motor 106 to produce the stepper motor device 100.

Figure 6:
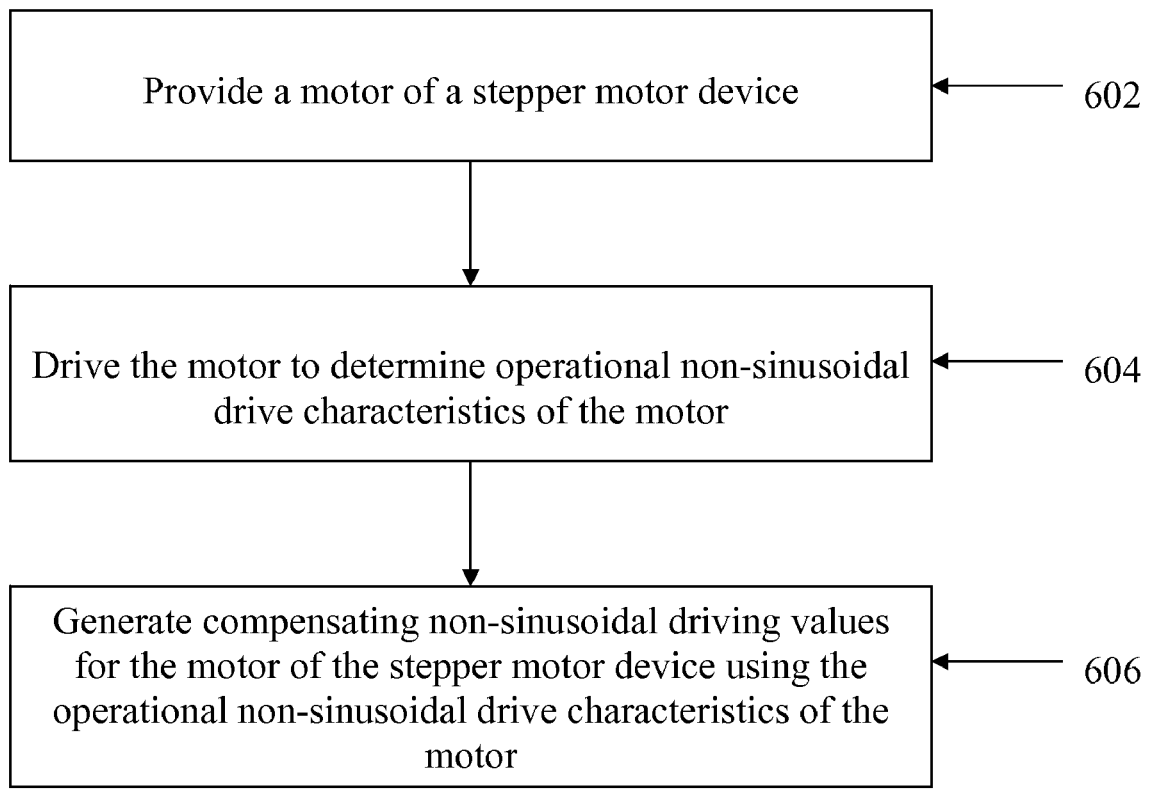
FIG. 6 is a process flow diagram of a method of producing compensating non-sinusoidal driving values for a stepper motor device in accordance with an embodiment of the invention.

A method of producing compensating non-sinusoidal driving values for a stepper motor device in accordance with an embodiment of the invention is described with reference to a process flow diagram of FIG. 6. At block 602, a motor of the stepper motor device is provided. Next, at block 604, the motor is driven to determine operational non-sinusoidal drive characteristics of the motor. Next, at block 606, the compensating non-sinusoidal driving values for the motor of the stepper motor device are generated using the operational non-sinusoidal drive characteristics of the motor so that the operational non-sinusoidal drive characteristics of the motor are compensated when the compensating non-sinusoidal driving values are used to drive the motor.

Figure 7:
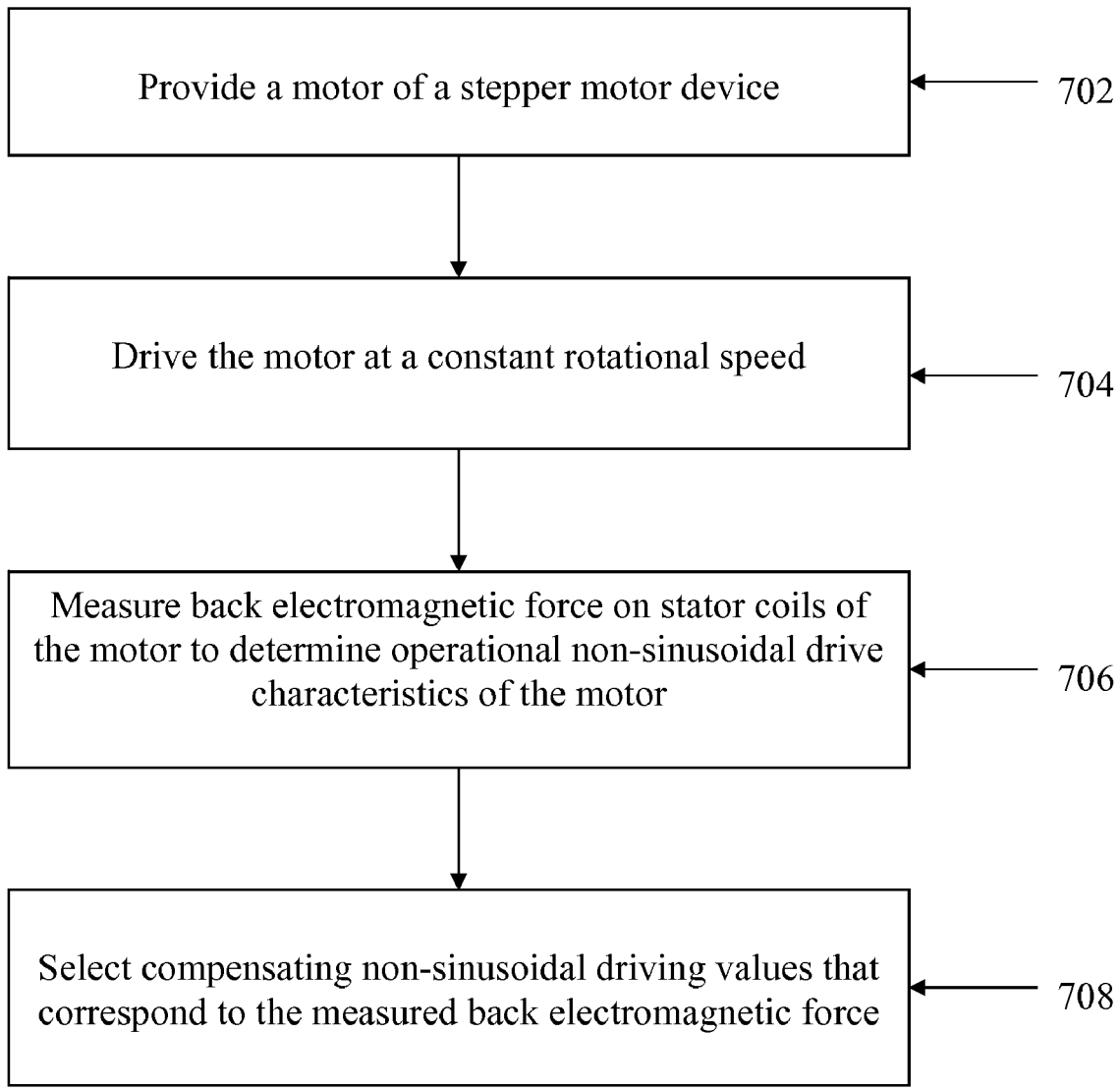
FIG. 7 is a process flow diagram of a method of producing compensating non-sinusoidal driving values for a stepper motor device in accordance with another embodiment of the invention.

A method of producing compensating non-sinusoidal driving values for a stepper motor device in accordance with another embodiment of the invention is described with reference to a process flow diagram of FIG. 7. At block 702, a motor of the stepper motor device is provided. Next, at block 704, the motor is driven at a constant rotational speed. Next, at block 706, back electromagnetic force on stator coils of the motor are measured to determine operational non-sinusoidal drive characteristics of the motor. Next, at block 708, the compensating non-sinusoidal driving values are selected that correspond to the measured back electromagnetic force so that the operational non-sinusoidal drive characteristics of the motor are compensated when the compensating non-sinusoidal driving values are used to drive the motor.

Figure 8:
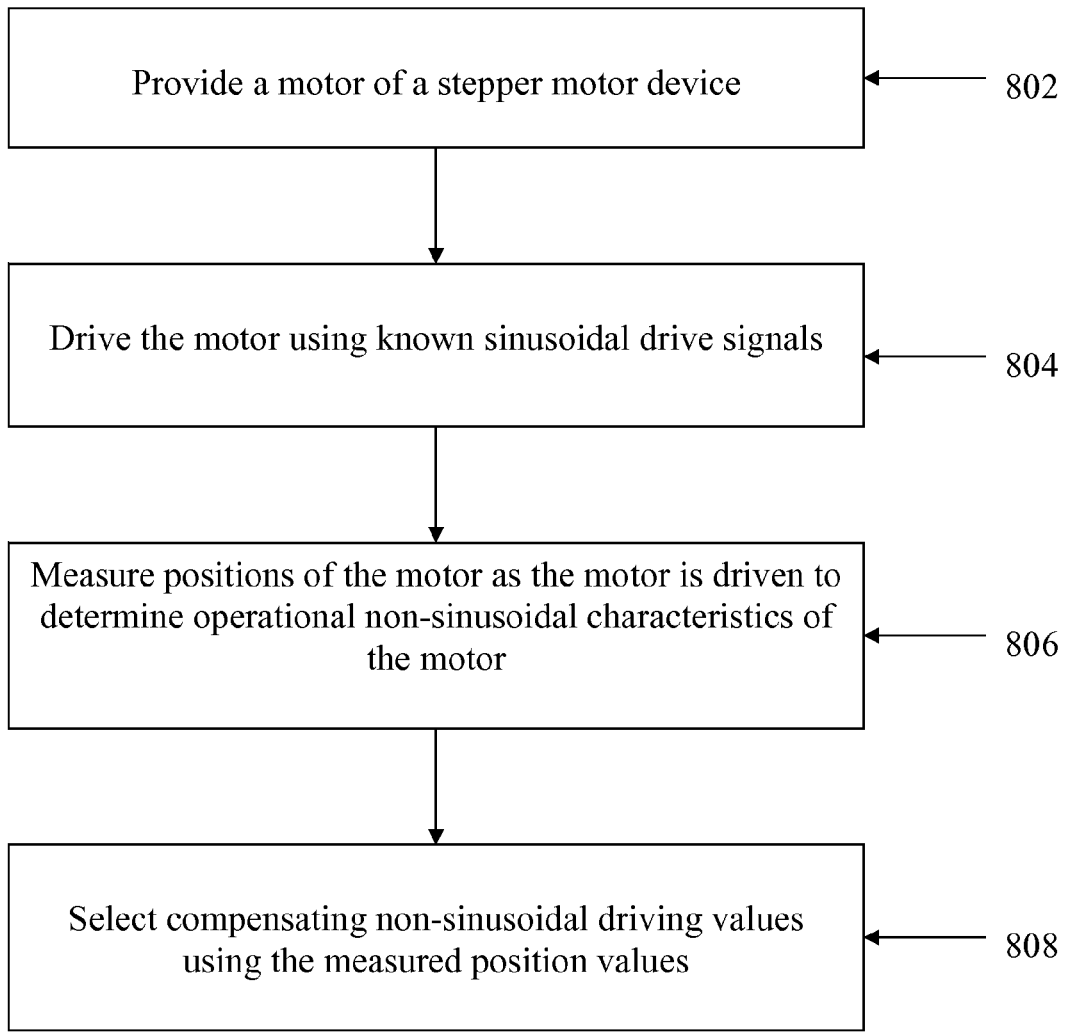
FIG. 8 is a process flow diagram of a method of producing compensating non-sinusoidal driving values for a stepper motor device in accordance with another embodiment of the invention.

A method of producing compensating non-sinusoidal driving values for a stepper motor device in accordance with another embodiment of the invention is described with reference to a process flow diagram of FIG. 8. At block 802, a motor of the stepper motor device is provided. Next, at block 804, the motor is driven using known sinusoidal drive signals. Next, at block 806, positions of the rotor as the motor is driven are measured to determine operational non-sinusoidal characteristics of the motor. Next, at block 808, the compensating non-sinusoidal driving values are selected using the measured positions so that the operational non-sinusoidal drive characteristics of the motor are compensated when the compensating non-sinusoidal driving values are used to drive the motor.

Although specific embodiments of the invention have been described and illustrated, the invention is not to be limited to the specific forms or arrangements of parts so described and illustrated. As an example, the invention can be applied to three-phase and five-phase stepper motors. The scope of the invention is to be defined by the claims appended hereto and their equivalents.

What is claimed is:

1. A stepper motor device comprising:
a motor; and
a motor driver connected to the motor to provide first and second driving signals to drive the motor, the motor driver comprising:
memory including a first array of compensating non-sinusoidal driving values and a second array of compensating non-sinusoidal driving values, the compensating non-sinusoidal driving values of the first and second arrays being configured to compensate for operational non-sinusoidal drive characteristics of the motor, the first array of compensating non-sinusoidal driving values and the second array of compensating non-sinusoidal driving values being prestored in the memory before the compensating non-sinusoidal driving values are used to drive the motor;
power circuitry connected to the motor to supply the first and second driving signals to the motor using the compensating non-sinusoidal driving values of the first and second arrays, the first driving signals being analog representations of the compensating non-sinusoidal driving values in the first array, the second driving signals being analog representations of the compensating non-sinusoidal driving values in the second array; and
a logic controller connected to the power circuitry and the memory to provide the compensating non-sinusoidal driving values of the first and second arrays to the power circuitry to drive the motor.

2. The device of claim 1 wherein the compensating non-sinusoidal driving values of the first and second arrays correspond to back electromagnetic force on stator coils of the motor when the motor is driven at a constant rotational speed.

3. The device of claim 1 wherein the compensating non-sinusoidal driving values of the first and second arrays correspond to values to drive the motor to predefined rotational positions.

4. The device of claim 1 wherein each of the compensating non-sinusoidal driving values of the first and second arrays corresponds to a particular test driving value selected from a plurality of test driving values, the particular test driving value being the value that drives the motor to a predefined rotational position.

5. The device of claim 1 wherein the memory including the first and second arrays of the compensating non-sinusoidal driving values is a non volatile memory.

6. The device of claim 1 wherein the memory including the first and second arrays of the compensating non-sinusoidal driving values is integrated with the logic controller.

7. A method of producing compensating non-sinusoidal driving values for a stepper motor device, the method comprising:
providing a motor of the stepper motor device;
driving the motor to determine operational non-sinusoidal drive characteristics of the motor;
generating the compensating non-sinusoidal driving values for the motor of the stepper motor device using the operational non-sinusoidal drive characteristics of the motor so that the operational non-sinusoidal drive characteristics of the motor are compensated when the compensating non-sinusoidal driving values are used to drive the motor; and
storing the compensating non-sinusoidal driving values as a first array of compensating non-sinusoidal driving values and a second array of compensating non-sinusoidal driving values in a memory so that the compensating non-sinusoidal driving values are used by a motor driver of the stepper motor device to drive the motor, the compensating non-sinusoidal driving values stored in the memory being used by power circuitry of the motor driver to supply first and second driving signals to the motor to drive the motor, the first driving signals being analog representations of the compensating non-sinusoidal driving values in the first array, the second driving signals being analog representations of the compensating non-sinusoidal driving values in the second array.

8. The method of claim 7 wherein the generating includes driving the motor to rotate at a constant speed, and wherein the generating comprises:
measuring back electromagnetic force on stator coils of the motor; and
selecting the compensating non-sinusoidal driving values that correspond to the measured back electromagnetic force.

9. The method of claim 8 wherein the selecting includes selecting the compensating non-sinusoidal driving values that correspond to the measured back electromagnetic force that are adjusted by a scaling factor.

10. The method of claim 7 wherein the generating includes driving the motor using sinusoidal driving values, and wherein the generating comprises:
measuring rotational positions of the motor as the motor is driven using the sinusoidal driving values, the measured rotational positions indicating the operational non-sinusoidal drive characteristics of the motor; and
analyzing the measured rotational positions to derive the compensating non-sinusoidal driving values so that the operational non-sinusoidal drive characteristics of the motor are compensated by the compensating non-sinusoidal driving values.

11. The method of claim 7 wherein the generating includes driving the motor using a plurality of test driving values, and wherein the generating comprises:
selecting a particular test driving value from the plurality of test driving values that drives the motor to a predefined rotational position, the particular test driving value being selected as one of the compensating non-sinusoidal driving values.

12. A method of producing compensating non-sinusoidal driving values for a stepper motor device, the method comprising:
providing a motor of the stepper motor device;
driving the motor at a constant rotational speed;
measuring back electromagnetic force on stator coils of the motor to determine operational non-sinusoidal drive characteristics of the motor; and
selecting the compensating non-sinusoidal driving values that correspond to the measured back electromagnetic force so that the operational non-sinusoidal drive characteristics of the motor are compensated when the compensating non-sinusoidal driving values are used to drive the motor; and
storing the compensating non-sinusoidal driving values as a first array of compensating non-sinusoidal driving values and a second array of compensating non-sinusoidal driving values in a memory so that the compensating non-sinusoidal driving values are used by a motor driver of the stepper motor device to drive the motor, the compensating non-sinusoidal driving values stored in the memory being used by power circuitry of the motor driver to supply first and second driving signals to the motor to drive the motor, the first driving signals being analog representations of the compensating non-sinusoidal driving values in the first array, the second driving signals being analog representations of the compensating non-sinusoidal driving values in the second array.

13. The method of claim 12 wherein the selecting includes selecting the compensating non-sinusoidal driving values that correspond to the measured back electromagnetic force that are adjusted by a scaling factor.

14. A method of producing compensating non-sinusoidal driving values for a stepper motor device, the method comprising:
providing a motor of the stepper motor device;
driving the motor using known sinusoidal drive signals;
measuring positions of the rotor as the motor is driven to determine operational non-sinusoidal characteristics of the motor;
selecting the compensating non-sinusoidal driving values using the measured positions so that the operational non-sinusoidal drive characteristics of the motor are compensated when the compensating non-sinusoidal driving values are used to drive the motor; and
storing the compensating non-sinusoidal driving values as a first array of compensating non-sinusoidal driving values and a second array of compensating non-sinusoidal driving values in a memory so that the compensating non-sinusoidal driving values are used by a motor driver of the stepper motor device to drive the motor, the compensating non-sinusoidal driving values stored in the memory being used by power circuitry of the motor driver to supply first and second driving signals to the motor to drive the motor, the first driving signals being analog representations of the compensating non-sinusoidal driving values in the first array, the second driving signals being analog representations of the compensating non-sinusoidal driving values in the second array.

15. The method of claim 14 wherein the selecting includes selecting a particular driving value from a plurality of the test driving values that correspond to the known sinusoidal drive signals that drives the motor to a predefined rotational position, the particular driving value being selected as one of the compensating non-sinusoidal driving values.

* * * * *